United States Patent
Sinha (10) Patent No.: US 8,131,768 B2
(45) Date of Patent: Mar. 6, 2012

(54) SYMBOLIC PROGRAM ANALYSIS USING TERM REWRITING AND GENERALIZATION

(75) Inventor: Nishant Sinha, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 609 days.

(21) Appl. No.: 12/331,344

(22) Filed: Dec. 9, 2008

(65) Prior Publication Data

US 2009/0281999 A1  Nov. 12, 2009

Related U.S. Application Data

(60) Provisional application No. 61/051,548, filed on May 8, 2008.

(51) Int. Cl.
*G06F 7/00* (2006.01)
(52) U.S. Cl. ........................................... 707/792
(58) Field of Classification Search .............. 707/798, 707/999.104, 792
See application file for complete search history.

(56) References Cited

U.S. PATENT DOCUMENTS

| | | | | |
|---|---|---|---|---|
| 6,922,830 | B1 * | 7/2005 | Schmidt ...................... | 717/155 |
| 2001/0011370 | A1 * | 8/2001 | Gunter et al. ................ | 717/4 |
| 2004/0117772 | A1 * | 6/2004 | Brand et al. ................. | 717/132 |
| 2007/0168927 | A1 * | 7/2007 | Campbell et al. .............. | 717/104 |
| 2009/0132861 | A1 * | 5/2009 | Costa et al. .................. | 714/45 |
| 2009/0164501 | A1 * | 6/2009 | de Moura et al. ............. | 707/102 |
| 2011/0078665 | A1 * | 3/2011 | Gulwani et al. .............. | 717/131 |

OTHER PUBLICATIONS

Flanagan et al, Avoiding Exponential Explosion: Generating Compact Verification Conditions, ACM SIGPLAN Notices vol. 36, Issue 3 (Mar. 2001 pp. 193-205.
King et al, Symbolic Execution and Program Testing, Comm of the ACM, vol. 19, No. 7, Jul. 1976.
Koelbl et al, Constructing Efficient Formal Models from High-Level Descriptions Using Symbolic Simulation, International Journal of Parallel Programming, vol. 33, No. 6, Dec. 2005.
Sethi et al, Conditional Expressions with Equality Tests, Journal of the Association for Computmg Machmery. vol. 25. No. 4, Oct. 1978, pp. 667-674.
Arons et al, Efficient Symbolic Simulation of Low Level Software, Proceedings of the conference on Design, automation and test in Europe, Munich, Germany, pp. 825-830 (2008).
Babic et al, Structural Abstraction of Software Verification Conditions, CAV 2007, LNCS 4590, pp. 366-378, 2007.
Burch, Techniques for Verifying Superscalar Microprocessors, Annual ACM IEEE Design Automation Conference, Proceedings of the 33rd annual Design Automation Conference, pp. 552-557, 1996.

* cited by examiner

*Primary Examiner* — Kimberly Lovel
*Assistant Examiner* — Mohammed R Uddin
(74) *Attorney, Agent, or Firm* — Bao Tran; Joseph Kolodka (57) ABSTRACT

Systems and methods are disclosed for analyzing data-flow using program expressions or terms by extracting a control flow graph node from a work list; merging symbolic term values at join nodes; performing simplification of term values using rewriting logic; determining successors of the graph node to which data must be propagated; and updating symbolic data for elements of the successors.

20 Claims, 5 Drawing Sheets

| |
|---|
| extract a control flow graph node from a work list (220) |
| merge symbolic term values at join nodes (230) |
| perform simplification of term values using rewriting logic (240) |
| determine successors of the graph node to which data must be propagated (250) |
| update symbolic data for elements of the successors (260) |
| display the program analysis for code review (270) |

SYMBOLIC PROGRAM ANALYSIS USING TERM REWRITING AND GENERALIZATION

This application claims priority to Provisional Application Ser. No. 61/051,548 filed May 8, 2008, the content of which is incorporated by reference.

BACKGROUND

Symbolic execution (SE) for program verification has been adopted as a popular verification technique, e.g., in the Java-PathFinder tool, and forms the basis of systematic dynamic testing techniques. SE's program analysis method proceeds by initializing all program inputs to unknown symbolic values and then propagates these values through the program control flow graph nodes by program exploration to check if an error location is reachable. Symbolic execution is a popular technique for bug-finding, providing program proofs as well as for systematic dynamic testing.

In SE, the program inputs are initialized to unknown symbolic values, and then propagated along program paths with the help of decision procedures. The main idea is to assign unknown symbolic values to input program variables and then propagate these values along paths of the program control flow graph using, e.g., depth-first-search (DFS). As compared to other verification techniques, SE combines the power of explicit and symbolic techniques in a unique manner for program verification: the technique can explore large program depths (which may be a bottleneck for symbolic techniques like bounded model checking), while symbolically exploring all possible inputs simultaneously (as opposed to explicit state techniques which enumerate the inputs). The symbolic state is represented as a pair $(C, \sigma)$, where $C$ is the path condition denoting the conjunction of all guards occurring in the current path, and $\sigma$ is a mapping from program variables to their symbolic values (terms). A SE engine relies on two main components: a term substitution computation for evaluating program expressions and updating symbolic values due to assignments, and, a decision procedure, e.g., an SMT solver, to check if the current symbolic values can be propagated into a conditional statement.

Two main bottlenecks arise when applying symbolic execution to verify large programs. Firstly, since the algorithm enumerates all program paths iteratively, there may be an exponential number of paths to be explored (known as the path explosion problem), e.g., due to a sequence of conditional statements or function calls. Secondly, the terms representing the symbolic values of program variables eventually blow-up after several substitution operations. Moreover, symbolic execution of loops may lead to deep execution paths, which may cause further blow-up. Although modern incremental SMT solvers, e.g., are able to handle such blow-up for path conditions to a certain extent by using specialized algorithms, deep program exploration reduces their performance significantly. Moreover, they do not help simplifying the state representation in any way.

Several approaches have been proposed to perform forward symbolic execution and backward weakest preconditions effectively. Expression renaming was proposed to avoid blowup during weakest precondition computation by using SSA representation. Although SSA representation assists SMT solvers to a certain extent, it does not allow semantic simplifications of symbolic values that SSA variables may assume. By preserving term structure in the symbolic state being propagated, the instant technique is able to perform term simplifications using rewriting, before flattening terms to clauses. These simplifications are hard to obtain at the clausal level inside an SMT solver, as is demonstrated by the instant experiments. Moreover, calls to SMT solver are obviated in many cases due to rewriting. Arons et al. and Calysto reuse SAT query results by caching and structural term analysis. Simplification and caching are complementary optimizations: simplification can reduce SAT query times even when caching fails and vice-versa.

In one approach, an equational axiomatization of the ite theory (the set of valid ite equations) was first provided by McCarthy and later by Bloom and Tindell and others. Sethi provided a more semantic algorithm (to overcome the locality of syntactic transformations) for simplifying ite-terms with equality predicates using two basic transformations: implied and useless tests. Nelson and Oppen proposed a method for simplification of formula, involving rules for ite-simplification based on McCarthy's axiomatization. Burch and Dill used a variant of Sethi's implied test to check satisfiability of ite-terms over the logic of equality and uninterpreted symbols (EUF) using a specialized case-splitting algorithm. Burch proposed an improvement in terms of a simplification algorithm for ite-terms, again based on the implied test. Similar rewrite rules have been proposed to extend BDD-like representations to the EUF logic and the logic of difference constraints, e.g., a rewrite system for normalizing decision diagrams with nodes containing equality over variables.

SUMMARY

Systems and methods are disclosed for analyzing data-flow using program expressions or terms by extracting a control flow graph node from a work list; merging symbolic term values at join nodes; performing simplification of term values using rewriting logic; determining successors of the graph node to which data must be propagated; and updating symbolic data for elements of the successors.

Implementations of the above aspect may include one or more of the following. The process includes performing symbolic program analysis through rewriting engines with decision procedures such as an SMT solver. The process can determine join if needed. The succesors can be determined using an SMT solver. The process includes simplifying choose-terms to if-then-else (ite)-terms. The ite-terms can use equational axioms, semantic rules and rules for presburger arithmetic. Terms at loop nodes can be simplified using anti-unification. A bounded parameterized term can be constructed. The process includes generalizing similar terms obtained at a loop head. Analysis results can be generated during symbolic program analysis using choose and ite function operators. The process can use rewriting rules in a rewrite logic to uniformly simplify terms over a combination of theories. Data can be represented as condition-value pairs and computing joins using choose functions over such pairs. Symbolic terms can be generated during program analysis using a rewrite engine. Ite expressions can be simplified using equational axioms and semantic methods. The rewrite system can include Presburger arithmetic rules in a rewrite logic theory. The process includes simplifying, approximating and generalizing terms obtained from symbolic program analysis at loop heads using anti-unification. The process includes computing a bounded parameterized term by generalizing from individual terms obtained during symbolic analysis at loop head. Loop invariants can be generated given a parameterized term representation. The process can compute an under-approximation based on a parameterized term representation.

The system avoids path-explosion by using a worklist-based algorithm that performs concrete "joins" of data values along different paths. This is done by using choose and ite function operators. The system uses the theory of term rewriting to simplify the terms representing states. A set of rules is provided for simplifying choose and ite terms along with rules for simplifying presburger arithmetic expressions. The system simplifies terms at loop heads using the theory of anti-unification. Simplification is obtained by identifying common patterns among terms obtained at a loop head and computing a parametric representation for those terms.

Advantages of the preferred embodiment may include one or more of the following. The system is more scalable than previous symbolic execution methods, while allowing precise program analysis. The system efficiently analyzes programs by symbolic execution. The system provides a new method to avoid exploring exponential number of paths (path explosion) and blowup of term-based state representation during symbolic execution.

DESCRIPTION

Figure 1:
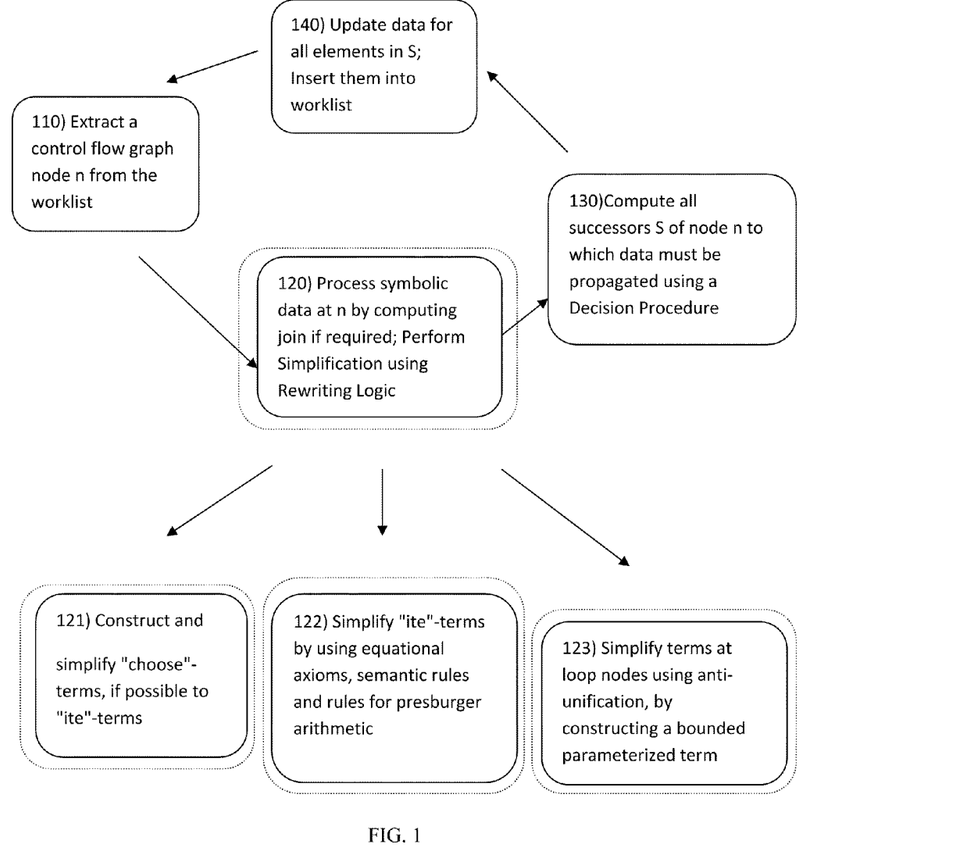
FIG. 1 shows an exemplary symbolic program analysis system.
Figure 2:
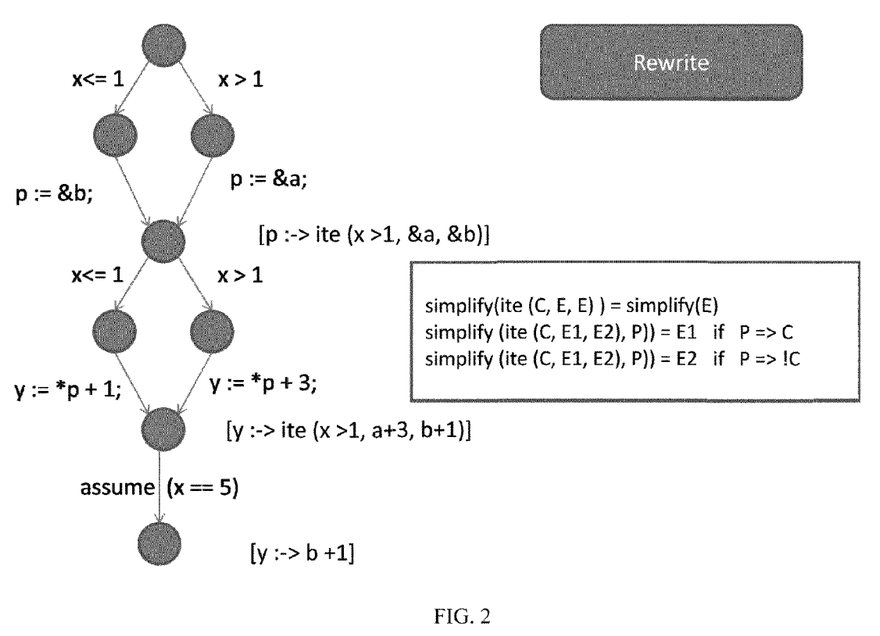
FIG. 2 shows an exemplary rewrite example.

FIG. 1 shows a new program verification technique that addresses the problems by (a) performing a work list based analysis that handles join points, and (b) simplifying the intermediate state representation by using term rewriting. In addition, the technique compacts expressions generated during analysis of program loops by using a term generalization technique based on anti-unification.

Turning now to FIG. 1, the process extracts a control flow graph node n from the work list (110). Next, symbolic data is processed at node n by computing the join if required and performs simplification using rewriting logic (120). From 120, the process contructs and simplifies "choose" terms to "if-then-else (ite)" terms if possible (121). Alternatively, the process can simplify the "ite" terms bys using equational axioms, semantic rules, and presburger arithmetic rules (122). In another option, the process can simplify terms at loop nodes using anti-unification by constructing a bounded parameterized term (123).

Next, the process of FIG. 1 computes all successors S of node n to which data must be propagated using a decision procedure such as a SMT solver (130). The process then updates data for all elements in S and inserts them into the work list (140).

In order to avoid path explosion during analysis, the instant system performs program traversal using a work list based approach, as in several data-flow analysis algorithms. This approach necessitates handling join nodes by merging information obtained from the incoming paths. The incoming symbolic information is combined by using a choose function symbol, which allows the system to select non-deterministically among multiple symbolic values. In contrast to approaches based on abstract interpretation which perform approximation at join points, using choose avoids losing any path-specific information, while maintaining a functional representation of the state.

Term blow-up in the state representation is the main bottleneck for SE. Apart from the blow-up due to repeated substitutions, there is additional blow-up due to large choose-terms obtained by merging symbolic values from multiple paths. In order to ameliorate this blow-up, term rewriting methods is used to simplify intermediate terms. This technique is useful because at most join points, the incoming symbolic values are guarded by disjoint path conditions. Hence, the choose-terms computed at those join points can be simplified to ite (if-then-else) terms. Storing symbolic values as structured ite-terms enables us to exploit their structure to obtain significant simplification. Consider, for example, the two program snippets in Table 1(a) and (b). In (a), $(x \mapsto ite(z>1, v_1, v_2)$ is obtained after analyzing the first conditional statement. On analyzing further, $\{y \mapsto ite(z=3, k+ite(z>1, v_1, v_2), \perp_y)\}$ is obtained where $\perp_y$ is an unknown value. The terms representing symbolic values would blow up quickly from such analysis. Rewriting based ite-term simplification leads to significant term compaction in such cases. For example, using the rewrite rules $\{y \mapsto ite(z>1, k+v_1, \perp_y)\}$ can be obtained. Similarly, in Table 1(b), $\{b \mapsto t_1\}$ is obtained. Simplifying ite-terms is especially useful for cases like (b), where an imprecise pointer analysis may lead to large ite terms. Compacting ite terms, therefore, is the focus of the instant simplification procedure.

TABLE 1

| (a) | (b) |
|---|---|
| if(z > 1) x := $v_1$; | p := &a; |
| else x := $v_2$; | ... |
| ... | b := (p = &a)?$t_1$ : $t_2$; |
| if(z = 3) y := x + k; | |

The system of FIG. 1 provides a unified methodology for ite-simplification in terms of a (terminating) rewrite system specified in the general framework of rewriting logic. The rewrite system combines the rules from the equational axiomatizations of the ite theory, as well as more semantic rules for simplifying ite-terms. The instant rules generalize and extend the previous set of rules to allow further simplification. A procedure for simplifying ite terms, in turn, needs simplification rules for terms involving other theories for exhaustive simplification. To this effect, the system provides additional rules for simplifying Presburger arithmetic constraints, which commonly occur in program verification.

At loop heads, however, the system cannot reduce choose-terms to ite-terms in most cases. Consider, for example, a simple loop for (i:=0;i<100; i:=i+2); . The states obtained on symbolic analysis of this loop for variable i will be of form $\{i \mapsto choose (\langle(true,0), (true,2), (true,4), \ldots \rangle)\}$, which will blow-up as the number of loop iterations become larger. Here, the values 0, 2, 4, . . . occur under the same path condition true and hence the system cannot obtain an ite term. The system uses a technique for compactly representing such terms based on the idea of anti-unification. Anti-unification (the dual of term unification) is a method to generalize a set of terms by identifying the common structure in the term set, while merging the differences among them by introduction of new variables. Symbolic analysis of loops typically produces similar expressions at the loop head, which can be, abbreviated to a term parameterized by the loop counter. For example, on generalizing the above choose term, the system obtains a parameterized term of form choose $((1 \leq j \leq k, 2 \times j))$, where j is a new index variable, k is the number of loop iterations performed at a given point, and, $1 \leq j \leq k$ and $2 \times j$ denote the parameterized condition and term values respectively.

The task of simplifying first-order logic terms is not trivial. While each of the simplification rules maybe relatively simple, there are a large number of them and they need to be applied effectively, in the correct order. Hence, using a rewrite engine is apt for the purpose of simplification. Moreover, the instant rule set is modifiable, i.e., rules can be added or removed in order to specialize the analysis to the verification task at hand. Note that having a dedicated simplification engine for this purpose is impractical, since it must be modified for every rule addition/deletion. Finally, term rewriting based on rewrite logics provides a seamless framework for simplifying terms over a combination of theories, which is crucial for a program analysis algorithm.

By preserving term structure in the symbolic state being propagated, the instant technique is able to perform term simplifications using rewriting, before flattening terms to clauses. These simplifications are hard to obtain at the clausal level inside an SMT solver, as is demonstrated by experiments. Moreover, calls to SMT solver are obviated in many cases due to rewriting. Simplification and caching are complementary optimizations: simplification can reduce SAT query times even when caching fails and vice-versa.

Next, concepts related to rewriting logic specifications are introduced. A signature $\Sigma$ is a set of function symbols, where each $f \in \Sigma$ is associated with a non-negative integer n, called the arity of f. The constant symbols have arity zero. A symbol can have one or more arities. $\Sigma$ is many-sorted, i.e., different symbols belong to different sorts (types). Let X denote a set of variables disjoint from $\Sigma$. In one embodiment, variables are of either Boolean or integer sorts and function symbols of either expression or predicate sorts. Given a signature $\Sigma$ and a set of variables X, the set of all terms over X is denoted by $T(\Sigma,X)$ (T, in short). For example, f (a, g(x, y)) is a term over symbols f, g and a, and variables x and y, A term containing no variables is said to be a ground term. A term of predicate sort is also referred to as a formula. To avoid confusion, the symbol $\equiv$ is used for syntactic identity of terms.

Symbols s, t, etc. are used to denote terms. Binary function symbols (such as +, *) are written in infix form, e.g. (x+y) instead of +(x, y). A term with outermost symbol f as an f-term and denote the empty term by $\lambda$. Symbols x, y are used for variables, a, b for constants, p, q for predicates, and f, g, etc. for other functions.

A substitution $\sigma: X \to T$ is a partial mapping from variables to terms denoted by $\{x_1 \mapsto s_1, \ldots, x_n \mapsto s_n\}$, indicating that the variable $x_i$ maps to the term $s_i$. The notation $\sigma(x_i)=s_i$. The domain of a substitution $\sigma$, denoted by $dom(\sigma)$ consists of the set of variables for which $\sigma$ is defined. For a term t and a substitution $\sigma$, the image of t under $\sigma$ by t$\sigma$ is defined as follows: if $\sigma(x)=s$, then $x\sigma \equiv s$; else if $x \notin dom(\sigma)$, then $x\sigma \equiv x$; and, $f(s_1, \ldots, s_n)\sigma \equiv f(s_1\sigma, \ldots, s_n\sigma)$.

A term-rewriting or rewrite system is a set of rewrite rules, $l \to r$, where l and r are each terms, both of which may contain variables which refer to arbitrary terms. An equation is a formula of the form r=s where r and s are terms. A conditional equation is of form $u_1=v_1 \wedge \ldots \wedge u_n=v_n \Rightarrow r=s$. A (conditional) equational system is any set of equations. Rewriting mainly involves orienting equations (fixing a direction for applying them) to obtain rules of form $l \to r$, finding a subterm t matching l (say, t=l$\sigma$), and then applying substitution to replace t by r$\sigma$. The goal of such a computation is to obtain a normal form, i.e., a term which cannot be rewritten further. Rewrite systems have two desirable properties: termination and confluence. A rewrite system is terminating if no term can be rewritten infinitely. A rewrite system is confluent if rewriting equal terms always leads to a unique normal form (irrespective of the order of application of rules). A terminating and confluent rewrite system is also said to be convergent: all derivations in such systems lead to unique normal forms. Hence, such systems can be used to decide equational theories by checking if two (potentially equal) terms rewrite to the same normal form.

A rewrite logic theory consists of a set of uninterpreted symbols (e.g., car, cons, insert, delete, etc.) constrained equationally by defining a set of equations on those symbols, together with a set of rewrite rules meant to define the evolution of the system. Although equational definitions differ from rewrite rules semantically, both of them are executed as rewrite rules. One embodiment processes equational definitions, e.g., of the ite symbol. Rewrite logics are quite powerful: they can be used to specify semantics of different kinds of languages and models of concurrency as well as different kinds of logic. Datatypes defined using algebraic specifications and the operations (constructors, modifiers, observers) on them are specified using (conditional) equations. For example, Maude is a high performance system that supports both equational and rewriting logic specifications over many-sorted signatures. The ability to specify conditional equations in Maude supports writing of simplification rules involving multiple theories.

The process of FIG. 1 was implement in the F-Soft verification framework using the Maude term rewriting engine. Experiments show that the proposed method is effective in improving verification times on real-life benchmarks.

Basic modeling assumptions are discussed next for verifying C programs in F-Soft. A program is modeled as a control flow graph (CFG) G=(V, E), where V and E are the set of nodes and edges respectively. A subset of nodes in a CFG are marked as error nodes, which correspond to assertion failures when checking for various program properties. Each edge $e_{ij}=(v_i,c_{ij},v_j)$ represents a guarded transition between nodes $v_i$ and $v_j$ with the guard $c_{ij}$. Each node has a set of assignments associated with it (parallel assignments to program variables). Each assignment is of the form x:=t, where x is a program variable and t is a term over program variables. Each program variable is assigned an integer address and pointers as modeled as integers having address values. Pointer dereferences are translated to an ite-term based on a points-to analysis; the result of the expression is the value of variable v if the pointer value equals the integer address value assigned to v. Functions are not inlined; matching calls and returns are identified by assigning a unique value to a caller-id variable for each call-return pair. Heap and stack are modeled as finite arrays, which leads to a bounded model.

The instant symbolic analysis algorithm uses a work list to propagate symbolic values instead of exploring each path explicitly. The data representation used in the algorithm is discussed next.

Symbolic Data. The algorithm represents the symbolic state as a condition-map pair $(C,\sigma)$ (cm-pair in short), where C denotes the current path condition predicate and $\sigma$ denotes a map from program variables to their symbolic values (terms $t \in T$). A condition-value pair cv=(C,t) (cv-pair in short) is the projection of a cm-pair on a particular program variable, say x, where C is the path condition and the term t denotes the value of x. Intuitively, $x \mapsto (C, t)$ denotes the set of concrete program states where C holds and x has the symbolic value t. For each CFG node n, the algorithm stores a list of cm-pairs, denoted by $Data_n$. This list accumulates symbolic values for a node so that the system can process them later in a lazy manner. Given a cm-pair $D=(C, \sigma)$ and a term t, the substitution t$\sigma$ denotes the evaluation of t with respect to D. Also, a procedure ComputePost evaluates the set of assignments at a CFG node n with respect to a cm-pair D=(C, σ) and returns a new pair (C, σ') with updated values of variables.

choose and ite terms. The signature Σ contains four special function symbols, ite and itep, choose, choosep. The ite and itep symbols denote the if-then-else expressions over integer and predicate sorts, respectively. A term of form choose($(C_1, t_1),(C_2,t_2),(C_3,t_3)$) on expression sort denotes a non-deterministic choice between the values $t_i (1 \leq i \leq 3)$ given the corresponding condition $C_i$ holds. In other words, it corresponds to the union of sets of states for $(C_i, t_i)$. Similarly, choosep is defined on predicate sorts. A choose-term can have any number of cv-pairs as its argument. For ease of notation, both ite and itep are represented by ite and choose and choosep as choose. Also, the choose-term is represented as an abbreviated list, i.e., choose($\langle C_i, V_i \rangle$).

The pseudocode of the symbolic analysis is below:

```
1:  proc SymAnalyze( )
2:      // Let Q be a reverse postorder priority queue of CFG nodes
3:      while Q is not empty do
4:          n := pop(Q)
5:          if n is an error node then
6:              // Invoke error handling
7:              Continue
8:          end if
9:          (C_n, σ_n) := ProcessData(n)
10:         if n is not a Loop Head then
11:             for all successor n' of node n in CFG do
12:                 // Let C be the constraint on the edge (n, n')
13:                 C_n' := Cσ_n ∧ C_n
14:                 if C_n' is satisfiable then
15:                     D' := (C_n', σ_n)
16:                     UpdateData(n', D')
17:                     insert(Q, n')
18:                 end If
19:             end for
20:             ClearData(n)
21:         else
22:             // Let lc be the loop entry condition, n_o and n_i be
                     the successor nodes outside and inside the loop
                     respectively
23:             C' := (lc)σ ∧ C
24:             if C' is unsatisfiable then
25:                 n' := n_o
26:                 (C, σ') := UniftyData(LoopData_n)
27:                 D' := (C ∧ (¬lc)σ', x')
28:             else
29:                 n' = n_i
30:                 D' = (C', σ_n)
31:             end if
32:             UpdateData(n', D')
33:             insert(Q, n')
34:         end If
35:     end while
36: end proc 1:
2:
3:  Proc UpdateData(n, D)
4:      if n is a loop head node then
5:          LoopData_n := LoopData_n ∪ {D}
6:          Data_n := {D}
7:      else if n is a join node then
8:          Data_n := Data_n ∪ {D}
9:      else
10:         Data_n := {D}
11:     end if
12: end proc
1:  proc ProcessData(n)
2:      D := UnifyData(Data_n)
3:      // Let St_n be the set of statments in the node n
4:      D' := ComputePost(D, St_n)
5:      return D'
6:  end proc
1:  proc UnifyData(((C_1, σ_1), . . . , (C_n, σ_n)))
2:      if n > 1 then
3:          C := (C_1 ∨ . . . ∨ C_n)
4:          a := {x ↦ choose($\langle (C_1, σ_1(x)) \rangle$) |
                  x ∈ ∪_{i=0}^n (dom(σ_i) where σ_i(x) is well-defined.}
5:          return (C, σ)
6:      else
7:          return (C_1, σ_1)
8:      end if
9:  end proc
```

Referring now to the pseudo-code, the main procedure is SyAnalyze (SPA), which processes CFG nodes by iteratively popping a node n from a reverse postorder work list Q (essentially, where parent nodes are popped before child nodes), collecting the incoming symbolic information at n using ProcessData procedure, propagating the values to its successors and finally inserting the successors back into the list for processing. The ProcessData procedure first obtains the current symbolic value D associated with a node n using the UnifyData procedure and then uses ComputePost to update D with the results of assignments at node n. The procedure UnifyData collects the values in $Data_n$ by disjuncting the path conditions and combining the values in form of a choose term for each variable. Then SPA determines the successors n' of n to which values must be propagated. This is done by evaluating the edge condition C in the current state $σ_n$ ($Cσ_n$) and checking if its conjunction with the current path condition $C_n$ is satisfiable using a decision procedure (DP). If satisfiable, $Data_{n'}$ is updated with the new value D' and n' is inserted back into the list Q. After processing n, SPA sets $Data_n$ to an empty set. This avoids propagating the same set of values in the future iterations. The choose symbol should be eliminated from the predicates sent to a DP.

The SPA procedure is sound with respect to reachability of error nodes. Given a reachable error node and the corresponding path condition C, a witness input can be generated by using a DP to obtain a model for C. SPA may not terminate in general, due to undecidability of the program verification problem. In practice, under-approximation of values at loop exiting nodes can be used to ensure termination. In this case, the instant procedure can only detect errors soundly. The presented procedure can be optimized by checking if the current set of cm-pairs at a node being processed are subsumed by the cm-pairs processed at that node earlier. Also, one can use a different priority ordering for the work list that processes all the loop nodes first and then propagates the collected values forward.

Given a cm-pair cm=(C, σ) and a list of cm-pairs l=$\langle (C_1, σ_1), \ldots, (C_n, σ_n) \rangle$, cm is subsumed by l, if the set of states represented by cm is a subset of the union of the set of states represented by elements of l. The system can check if cm is subsumed by l, denoted as subsume (cm, l), by using a DP. The terms are rewritten so that no unary or binary operator term contains a choose or ite-term as a subterm. The predicate subsume(cm,l) is defined by structural induction over terms:

(S1) subsume((C,σ), $\langle C_i, σ_i \rangle$)=$\wedge_{x \in dom(σ)}$subsume((C, σ(x)), $\langle C_i, σ_i(x) \rangle$)

(S2) subsume((C,t), choose($\langle C_i, t_i \rangle$))=C ⇒ $\vee_i (C_i \wedge$ subsume((C, t), $t_i$))

(S3) subsume((C,t), ite(C', $t_1$, $t_2$))=$\wedge_{=1}^2 (C \wedge C') \Rightarrow$ subsume ((C,t), $t_i$)

(S4) subsume ((C, t), t')=(x=t ⇒ x=t'), otherwise,
where x is a fresh variable of appropriate sort.
Simplification by Rewriting The symbolic values, in particular choose terms, generated by the SPA procedure often blow-up quickly due to repeated substitutions and joins. Next, rules are discussed for simplifying choose-terms; the main idea is to convert them to ite-terms whenever possible and then use a variety of simplification rules on ite-terms to avoid the blow-up. The rules are presented in terms of equations l=r; they can be directly converted to rewrite rules l→r. The following function symbols (with appropriate associativity and commutativity assumptions) are used: EQ and NEQ to denote equality and disequality (respectively) on expressions and integers; and, not, implies denote conjunction, negation and implication over predicates; $<, \leq, >, \geq$ represent the usual relation operators over expressions. The symbol e stands for the common binary operators ($\{+,*, \ldots\}$) over expressions. E, E', Et, Ee, F and G, are terms of expression sort, P and Q are integers and X, Y are variables of integer sort. An equation suffixed by the [owise] construct (borrowed from Maude syntax) denotes the fact that it will be used for rewriting when no other similar equation is applicable.

Rules for Choose

Here, the variable CV denotes a (possibly empty) list of cv-pairs. An unknown value is denoted by $\bot$. (C1-4) show the distributive and redundancy removal rules. Rules (C5-6) convert a choose-term to an ite term. Note that rule C6 involves checking that that $C_1$ is disjoint from other conditions.

(C1) choose($\langle$(false,t),CV$\rangle$)=choose(CV)

(C2) choose($\langle(C_1,t),(C_2,t),CV\rangle_=$ choose($\langle(C_1 \vee C_2, t), CV\rangle$)

(C3) choose($\langle C_i,t_i\rangle$)et=choose($\langle C_i,t_i et\rangle$)

(C4) choose($\langle$C, choose($\langle C_i,t_i\rangle$)), CV$\rangle$= choose($\langle C \wedge C_i,t_i\rangle$,CV$\rangle$)

(C5) choose($\langle$C,t$\rangle$)=ite(C,t,$\bot$)

(C6) choose($\langle(C_1,t_1) \ldots (C_n, t_n)\rangle$)= ite($C_1,t_1$,choose($\langle(C_2,t_2) \ldots (C_n,t_n)\rangle$)

if all for $2<i<n$, $C_1 \wedge C_i$=false

Rules for ITE

Table 3(a) shows a representative set of rules for ite-term simplification. The equations I1-6 correspond to equational axioms. The equations I7-10 generalize the axioms I5-6. The equation I11-12 allows distributing binary and unary operators to enable further simplification. Rules S1-10 correspond to more semantic rules proposed by Sethi. The rules S3-4 and S5-6 are a generalization of the implied and useless tests respectively, which is obtained by using a conditional equation. They are defined using a new operator simplEnv(t,P), denoting simplification of t assuming that an environment condition P holds. This is especially useful for simplifying nested ite-terms since the guard of an outer ite-term acts as a valid environment condition for an ite subterm. For simplifying any given term t, simplEnv(t,true) is at the top-level. The simplEnv rules modularize reasoning over ite-terms with reasoning on subterms from an arbitrary theory. For example, rule S6 checks if the condition P implies C is true, which is in turn performed by rewriting with rules for the (arbitrary) theories on which P and C are defined.

S7-8 are redundant rules (subsumed by S3-4); however, they are useful in cases where pattern-matching is sufficient to simplify the term. Rules S1-4 are new and provide additional simplifications over other rules. The main idea is that even if simplification cannot fully eliminate an ite-subterm, e.g., in rule S5-6, ite-subterms can still be simplified. S9-10 rules are used when no other rule is applicable. The rules for itep of predicate sort are analogous and omitted, as are rules for simplifying predicates over and not symbols and rules for integers and Booleans, which are standard.

Rules for Presburger Arithmetic

The arithmetic rules A1-14 essentially normalize all inequalities and disequalities to terms having only EQ and $\leq$ symbols, with integer constants collected on one side of the relation. Rules A15-19 handle the interaction between EQ and $\leq$ operators on terms. Rules A20-21 provide simplification for difference logic constraints.

TABLE 3

Rewrite rules for simplifying ite-terms and Presburger arithmetic terms

| (a) | (b) |
|---|---|
| (I1) ite (true, E, E') = E | *** arithmetic rules |
| (I2) ite (false, E, E') = E' | (A1) E NEQ E' = not (E EQ E') |
| (I3) ite (not N, E, E') = ite (N, E', E) | (A2) (E EQ P) and (E EQ Q) = false if P NEQ Q . |
| (I4) ite (N, E, E) = E | (A3) not(E EQ P) and (E EQ Q) = E EQ Q if P NEQ Q . |
| (I5) ite (N, ite(N, E, E'), F) = ite (N, E , F) | (A4) (E + P) EQ Q = E EQ (Q − P) |
| (I6) ite (N, F, ite(N, E, E') ) = ite (N, F , E') | (A5) −E EQ P = E EQ −p if E is not a variable |
| (I7) ite (N, ite(N1, E, E'), E) = | (A6) E > E' = E' <= E − 1 |
| ite (N and not N1, E', E) | (A7) E < E' = E <= E' − 1 |
| (I8) ite (N, ite(N1, E, E'), E') = | (A8) E >= E' = E' <= E |
| ite (N and N1, E, E') | (A9) not (E <= E') = E' <= E − 1 |
| (I9) ite (N, E, ite(N1, E, E')) = | *** orient constants to right and vars to left |
| ite (not N and not N1, E', E) | (A10) E + P <= E' = E <= E' − P |
| (I10) ite (N, E', ite(N1, E, E')) = | (A11) E <= X + E' = E − X <= E' |
| ite (not N and N1, E, E') | (A12) E <= − X + E' = E + X <= E' |
| (I11) ite (N, E, E')⊙F = ite (N, E⊙F, E'⊙F) | (A13) E <= X = E − X <= 0 |
| (I12) - ite (N, E, E')= ite (N, −E, −E') | (A14) E <= − X = E + X <= 0 |
| (S1) simplEnv (V, V EQ N and C) = N | (A15) (E <= F) and (E EQ G) = (G <= P) and (E EQ G) |
| (S2) simplEnv (ite(C and P, Et, Ee), C and Q) = | (A16) (E' + E <= F) and (E EQ G) = |
| simplEnv(ite (P, Et, Ee), C and Q ) | (E' + G <= F) and (E EQ G) |
| (S3) simplEnv (ite(C, Et, Ee), P) = | (A17) (−E <= F) and (E EQ G) = |
| simplEnv(Ee, P) if not(P and C) | (−G <= F) and (E EQ G) |
| (S4) simplEnv (ite(C, Et, Ee), P) = | (A18) (E <= P) and (E <= Q) = E <= P if P < Q |
| simplEnv(Et, P) if P implies C | (A19) (E <= P) and (E <= Q) = E <= Q [owise] |
| (S5) simplEnv (ite(C, X, Y), P) = Y | *** shostak's rules for difference logic |
| if P and C implies (X EQ Y) | (A20) (X + (− Y) <= P and Y + (− X) <= Q) = false if P + Q < 1 |
| (S6) simplEnv ( ite(C, X, Y), P) = X | (A21) (X <= P and − X <= Q) = false if P + Q < 0 |

TABLE 3-continued

Rewrite rules for simplifying ite-terms and Presburger arithmetic terms

| (a) | (b) |
|---|---| if P and not C implies (X EQ Y)
(S7) simplEnv (ite(C, Et, Ee), C and P) =
simplEnv(Et, C and P)
(S8) simplEnv (ite(C, Et, Ee), not C and P) =
simplEnv(Ee, not C and P)
(S9) simplEnv (ite(C, Et, Ee), P ) =
ite (C , simplEnv(Et, P and C),
simplEnv(Ee, P and not C) ) [owise]
(S10) simplEnv (E , P ) = E [owise]

Example. Consider a program fragment where on analysis, a term of form choose((x>1, y EQ 1),(x≦1, y EQ 0)) is obtained. Using the choose rules C5-6, ite(x>1, y EQ 1, ite(x≦1, y EQ 0, ⊥)) is obtained. Using the simplEnv rules (mainly due to S3), ite(x>1, y EQ 1, y EQ 0) is the final result.

SMT Decision Procedure (DP) Interface.

Recall the pseudocode for SPA procedure discussed above. In order to check for path feasibility, the procedure invokes a DP, an SMT solver in the instant case. Given an SMT DP interface, the system translates the symbolic value terms to a format that the interface supports. Although the translation for most other terms is standard, the predicate terms are translated with choose as the topmost symbol. Let term t be of form choosep($<C_i,t_i>$). Note that for each i, $t_i$ is a predicate. Therefore, t is translated into an equivalent formula $V_{i=0}^n$ ($C_i \Rightarrow t_i$). In general, the translation is as follows. Since the rewrite rules contain distributive laws for choosep and itep for all binary and unary operators, so for any given predicate term t, either choosep or itep is the top symbol, or there exists no subterm with either of the symbols. In the first case, t must be a predicate and can be handled as above. In the second case, if t is of form itep(P, $E_1, E_2$), then both $E_1$ and $E_2$ are predicates and can be translated recursively. A DP is also used for checking for mutual exclusiveness of arguments in choose-terms in the rule C6.

Optimizations. Program variables are not initialized to unknown values in the beginning. Instead, when computing a substitution, say to, the system lazily initializes a variable that occurs in t but not in σ. The simplification algorithm is called at two places: (i) during construction of choose-term in UnifyData procedure before calling the DP on a path condition formula. In the first case, the system obtains further compaction by simplifying under the environment context of the disjuncted path condition C (by using simplEnv(ite$_x$,C) where ite$_x$ is the ite-term value for variable x). The system first simplifies top-level choose-terms and then applies the ite and other rules.

Simplification for Loops

As mentioned earlier, the choose terms may blow-up during analysis of a loop since ite-based simplifications cannot be applied in such cases. The system uses a technique to simplify these terms based on the technique of anti-unification. The essential idea is to find a common pattern in the arguments of a choose expression that allows us to represent the list of arguments by a single parametric expression (if possible), together with additional constraints on the parameters. In other words, the instant goal is to obtain a parameterized generalization of the list of arguments in a choose-term.

Two terms $t_1$ and $t_2$ are said to be anti-unifiable if there is a term t (called the anti-unifier) and two substitutions $\sigma_1$, $\sigma_2$ such that $t\sigma_1 \equiv t_1$ and $t\sigma_2 \equiv t_2$. Intuitively, an anti-unifier (or a generalization) of a list of terms retains information that is common to all the terms, introducing new variables when information conflicts. The most specific generalization, if it exists, is desired which captures maximum similarity between the terms, e.g., the most specific generalization of the terms f(a,g(b,c)) and f(b,g(x,c)) is f(z,g(x,c)). Since the first argument of f can be either a or b, the introduction of a new variable z abstracts away this information in the generalized term. The generalization algorithm also produces two substitutions as a result: $\sigma_1=\{\mapsto a, x \mapsto b\}$ and $\sigma_2=\{z \mapsto b\}$. Note that $\sigma_1$ and $\sigma_2$ can be extended so that dom($\sigma_1$)=dom ($\sigma_2$) holds. It is known that for any list of terms, a most specific generalization (or anti-unifier) exists (for terms that are completely different, a single variable term is the trivial generalization).

The system finds a parameterized generalization of a list of terms, i.e., given $T=\{t_1 \ldots t_n\}$, the system computes some term t having a free variable k, such that $t_i \equiv t\sigma_i$, where $\sigma_i = \{k \mapsto i\}$ for all $1 \leq i \leq n$. t a parametric term and is written as t(k) henceforth. Also, a bounded parametric (bp-) term is defined to be of form $\oplus_{k=1}^u (t(k))$, where u and l denote the upper and lower bounds of the parameter k and $\oplus$ denotes an associative operator. This allows representing a list of similar terms by a single bp-term, e.g., T is represented as $t'=\oplus_{k=1}^n (t(k))$, where $\oplus$ stands for the list cons operator. Also, the term list T is abbreviated by a bp-term t'. Moreover, if the given list of terms is an argument to some function symbol f, then f is used instead of $\oplus$. For example, (a≠1 ∧ ... ∧a≠n), represented as $\dot\wedge$(a≠1, a≠2, ..., a≠n) in normalized form, is abbreviated as $\dot\wedge(\oplus_{i=1}^n(a \neq i))$, which is written as ($\dot\bigwedge_{i=1}^n$ (a≠i)).

A procedure (P—Au) that implements this generalization algorithm below.

```
 1: proc P-AU (⟨t_1,...,t_n⟩)
 2:    {t_au,⟨σ_1,...,σ_n⟩} := MATCH(⟨t_1,...,t_n⟩)
 3:    if ∀i. dom(σ_i) is empty then
 4:       return t_au
 5:    end if
 6:    σ := PARAMETERIZE(⟨σ_1,...,σ_n⟩)
 7:    if dom(σ) ≠ ∪_{i=0}^n dom(σ_i) then
 8:       return λ
 9:    else
10:       return ⊕_{i=1}^n PSUBST(t_au, σ)
11:    end if
12: end proc
 1: proc PARAMETERIZE (⟨t_1,...,t_n⟩)
 2:    Let σ := { }
 3:    // Let V := dom(σ_1) (= dom(σ_2)... = dom(σ_n))
 4:    for all v ∈ V do
 5:       // Let j and k be fresh variables not occuring elsewhere
 6:       if ∀i. σ_i(v) a constant (let σ_i(v) = c_i) then
```

-continued

```
 7:     Solve the list of equations E = {a × i + b = c_i}
 8:     if ∃a_0, b_0 satisfying all equations in E then
 9:         σ(v) := ⊕_{j=1}^{n}(a_0 × j + b_0)
10:     end if
11:   end if
12:   if ∀i. σ_i(v) is a list (let σ_i(v) = ⟨t_i^1,...,t_i^n⟩) then
13:     Compute for all i, t_i := P-AU(⟨t_i^1,...,t_i^n⟩)
14:     // Let t_i be of form ⊕_{li}^{u}_1(t_g'(j_i))
15:     Compute t(j) := P-AU(⟨(t_1'(j_1),...,(t_n'(j_n))⟩)
16:     Compute ⊕_{k=1}^{n}(u(k)) := P-AU(⟨u_1,...,u_n⟩)
17:     Compute ⊕_{k=1}^{n}(l(k)) := P-AU(⟨l_1,...,l_n⟩)
18:     if t(j), u(k) and l(k) are non-empty then
19:         σ(v) := ⊕_{k=1}^{n}(⊕_{j=l(k)}^{u(k)}(t(j)))
20:     end if
21:   end if
22: end for
23: return σ
24: end proc
```

The procedure P—Au first calls Match to find the common structure among the terms and compute the substitutions for the differences. The procedure Match computes an anti-unifier $t_{au}$ of a list of terms $t_1, \ldots, t_n$ together with the corresponding substitutions $\sigma_1, \ldots, \sigma_n$ respectively. These substitutions are passed on to Parameterize function, which computes a parametric substitution σ, if it exists, that generalizes the input substitution set. The Parameterize function either uses templates (e.g., a linear equation) for generalizing base cases or recursively calls P—Au for anti-unifying a list of subterms. Finally, the parameterized substitution σ is applied to the term $t_{au}$ obtained earlier, by using PSubst. Match uses an algorithm for computing a syntactic anti-unifier. If the function symbols in the terms are associative or commutative, the terms are first converted to their normal forms and then the previous algorithm can be used, e.g., the normalized form for a term containing nested ˆs has ˆ* as the top symbol. Alternatively, an approach to compute anti-unifiers modulo an equational theory based on manipulating regular tree languages can be used. In general, Match may return multiple possible substitutions, which must be processed by the procedure P—Au iteratively until an anti-unifier is found. Given a parameterized substitution $\{\sigma = v \mapsto \oplus_{i=1}^{u}(t(i))\}$ and a term t with free variable v, PSubst (t,σ) returns $\oplus_{i=1}^{u}(t')$ where t'=PSubst (t,{v↦t(i)}). For example, PSubst (c+v,v↦$\oplus_{i=0}^{n}$(i+4)) evaluates to $\oplus_{i=0}^{n}$(c+i+4).

Example. Given a list of terms $t_1 \equiv (a \neq 1)$, $t_2 \equiv (a \neq 1 \wedge a \neq 2)$, $t_3 \equiv (a \neq 1 \wedge a \neq 2 \wedge a \neq 3)$, P—Au (⟨$t_1, \ldots, t_3$⟩) will work as follows. P—Au first calls Match, which returns $\wedge^{\cdot}(v)$ with $\sigma_i(v) = \langle a \neq 1, \ldots, a \neq i \rangle$ for $1 \leq i \leq 3$. Here, each $\sigma_i(v)$ is a list and hence calling Parameterize leads to three recursive calls to P—Au with argument $\langle a \neq 1, \ldots, a \neq i \rangle$ for $1 \leq i \leq 3$. As a result, terms are derived $\oplus_{j=1}^{1}(a \neq j)$, $\oplus_{j=1}^{2}(a \neq j)$ and $\oplus_{j=1}^{3}(a \neq j)$. The next call to P—Au returns a≠j. The next two calls to P—Au return i (as a result of solution of linear equations) and 1 respectively. Hence Parameterize returns $\sigma = \{v \mapsto \oplus_{j=1}^{i}(a \neq j)\}$. Finally, PSubst ($\wedge^{\cdot}(v)$, σ) produces the result $\wedge_{j=1}^{i}(a \neq j)$, and the value $\oplus_{i=1}^{n}(\wedge_{j=1}^{i}(a \neq j))$ is returned.

The Parameterize algorithm will succeed only if a list of constants can be anti-unified using a linear equation template of form a×k+b (otherwise it returns an empty term λ). The algorithm can be extended to allow addition of more templates (e.g., of polynomial form) provided a decision procedure is available for the corresponding theory.

Let $t = \oplus_{k=0}^{n}(t(k)) = $ P—Au (⟨$t_1, \ldots, t_n$⟩) (t≠λ). Then ∀1≤i≤n. PSubst (t(k), {k↦i})=$t_i$ (modulo expansion).

For simplifying choose-terms, a technique is needed to convert a bp-term obtained after generalization back into a term without bounds. Given a bp-term t of form $\oplus_{i=1}^{u}(t(i))$, a cv-pair is obtained over ordinary terms by iteratively eliminating bounds in t inside-out using a quantifier elimination procedure for Presburger arithmetic, e.g., Fourier-Motzkin elimination. A procedure Elim-BP performs this conversion: for a term t, Elim-BP (t)=(c,t'), where c is the predicate corresponding to bound constraints and t' is an ordinary term. For example, Elim-BP BP ($\vee_{i=1}^{10}(\wedge_{j=1}^{i}(a \neq j))$) returns a cv-pair (a<0∨a>1, true) after simplification. The Abbr-Choose algorithm for abbreviating a choose-term is as follows:

```
 1: proc SIMPLIFY-CHOOSE(choose({(c_1, t_1),...,(c_n, t_n)}))
 2:   c := P-AU(⟨c_1,...,c_n⟩)
 3:   t := P-AU(⟨t_1,...,t_n⟩)
 4:   if both c and t are non-empty then
 5:       (c',c'') := ELIM-BP(c)
 6:       (c_t,t') := ELIM-BP(t)
 7:       return choose((c'∧c''∧c_t, t'))
 8:   else
 9:       return choose(⟨(c_1, t_1),...,(c_n, t_n)⟩)
10: end if
```

Given a choose-term, say t, the Abbr-Choose procedure invokes P—Au on the list of conditions and values separately. If P—Au succeeds, then a new choose-term with the abbreviated cv-pair is returned. In this case, a more compact representation of the choose-term is obtained by adding constraints in terms of new variables. Otherwise, the original expression is returned. Note that choose-terms are generated at all join points. However, it is wasteful to try to abbreviate them at nodes other than loop heads (loop exit nodes, in general), since the terms obtained from merging different paths are mostly different. Therefore, the system only applies Abbr-Choose at loop heads. Note that Abbr-Choose does not approximate the choose terms; it tries to compute an equivalent parameterized term, if possible. Although Abbr-Choose may lead to a more compact choose-term at a loop exit after each iteration, the number of iterations needed for exiting a loop can be large or unknown. This problem can be avoided by computing an under-approximation as follows.

Under-approximation. The system under-approximates by essentially fixing the maximum number of iterations, say cnt, for which the loop is analyzed. Given a loop condition predicate p, a cm-pair (c,σ) is loop-exiting if (pσ∧c) is satisfiable. When the number of loop-exiting cm-pairs at a loop-exit node exceeds cnt, the system under-approximates by merging and propagating the current set of cm-pairs outside the loop. As a result, the instant approach can only detect errors soundly; in order to obtain proofs, the system would either have to continue analysis until the loop terminates or use an over-approximate loop invariant. The abbreviated bp-term may also be used for computing the loop bounds and invariants as well.

Figure 3:
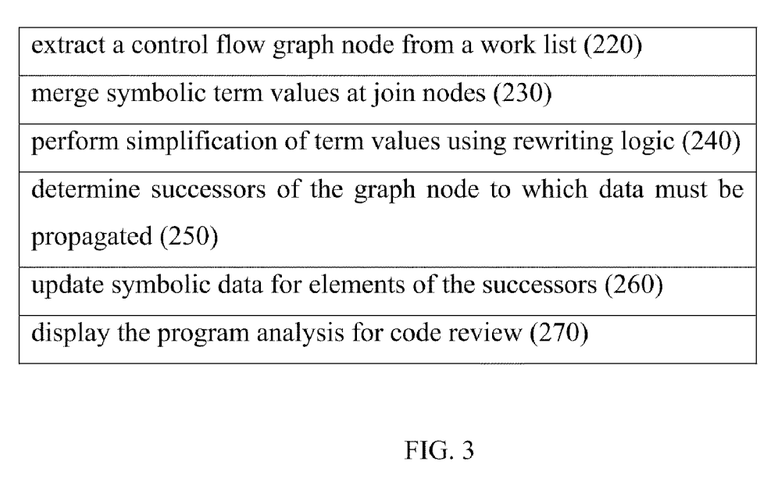
FIG. 3 shows an exemplary symbolic program analysis (SPA) process.

FIG. 3 shows an exemplary symbolic program analysis (SPA). The process analyzes data-flow using program expressions or terms. First the program extracts a control flow graph node from a work list (220). The process merges symbolic term values at join nodes (230) and performs simplification of term values using rewriting logic (240). The process determines successors of the graph node to which data must be propagated (250) and updates symbolic data for elements of the successors (260). In one embodiment, the process displays the program analysis for code review (270). Alternatively, the output of the program analysis can be sent as computer readable information to another computer system for performing additional software analytics.

The process can perform symbolic program analysis through rewriting engines with decision procedures such as an SMT solver. The process can determine join if needed. The succesors can be determined using an SMT solver. The process includes simplifying choose-terms to if-then-else (ite)-terms. The ite-terms can use equational axioms, semantic rules and rules for presburger arithmetic. Terms at loop nodes can be simplified using anti-unification. A bounded parameterized term can be constructed. The process includes generalizing similar terms obtained at a loop head. Analysis results can be generated during symbolic program analysis using choose and ite function operators. The process can use rewriting rules in a rewrite logic to uniformly simplify terms over a combination of theories. Data can be represented as condition-value pairs and computing joins using choose functions over such pairs. Symbolic terms can be generated during program analysis using a rewrite engine. Ite expressions can be simplified using equational axioms and semantic methods. The rewrite system can include Presburger arithmetic rules in a rewrite logic theory. The process includes simplifying, approximating and generalizing terms obtained from symbolic program analysis at loop heads using anti-unification. The process includes computing a bounded parameterized term by generalizing from individual terms obtained during symbolic analysis at loop head. Loop invariants can be generated given a parameterized term representation. The process can compute an under-approximation based on a parameterized term representation.

The system avoids path-explosion by using a worklist-based algorithm that performs concrete "joins" of data values along different paths. This is done by using choose and ite function operators. The system uses the theory of term rewriting to simplify the terms representing states. A set of rules is provided for simplifying choose and ite terms along with rules for simplifying presburger arithmetic expressions. The system simplifies terms at loop heads using the theory of anti-unification. Simplification is obtained by identifying common patterns among terms obtained at a loop head and computing a parametric representation for those terms.

Figure 4:
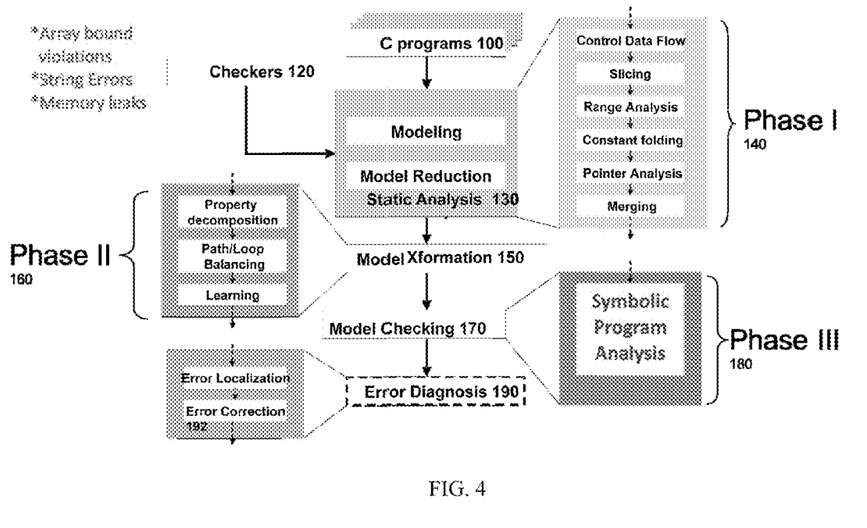
FIG. 4 shows an exemplary software verification framework with the SPA process of FIG. 3.

The SPA process was implemented in the F-Soft verification framework for C programs, shown in FIG. 4. In this framework, software such as C programs 100 to be tested against standard safety checkers 120 are provided to a static analyzer 130 which performs modeling and model reduction. In Phase I 140 which is detailed below, the analyzer determines control data flow, slicing, range analysis, constant folding, pointer analysis, and code merging, among others. The static analyzer 130 receives input from code checkers 120 comprising checks for array boundary violations, string errors, and memory leaks, among others. The annotated program with checkers is analyzed by the static analyzer, which uses various dataflow algorithms ranging from simple constant folding to more complex numerical analysis algorithms such as intervals, octagons, polyhedra, and disjunctive numerical domains to compute state invariants for all the statements in the program. The property checkers for the safety properties that are proved by the static analyzer are pruned away, and the resulting program is provided to a model transformer 150, which. performs property decomposition, path/loop balancing, and learning, among others. The framework also includes a model checker 170 which provides Phase III 180 where it performs symbolic program analysis in accordance with FIG. 1. If the model checker finds any violations, it generates an error trace showing how the property is violated. The error trace generated by the model checker is sliced with respect to the variables in the violated property, and the sliced trace is shown to the user. Next, error diagnosis is generated in module 190. This can include error localization operations 192.

The SMT solver YICES Was the decision procedure (DP) and the Maude rewrite engine was used for implementing rewrite-based simplifications. An optimized DFS-based symbolic execution (DFS-SE) algorithm, similar to (without symbolic state abstraction), was implemented in the F-Soft framework using YICES. Two parameters, depth and loop bounds are used to limit the search in DFS-SE. The depth bound denotes the maximum depth of the stack, while the loop bound denotes the maximum number of times a node can occur on the stack. SPA also uses the loop bound parameter for under-approximation (cf. Section 4). For handling path conditions in DFS-SE, incremental SMT solving in YICES (+IncSMT) and a combination of rewriting with DP (+Rew) was tried. For SPA, the results with and without rewriting based simplifications (+/−Rew) were compared. The rules for choose-terms are implemented in memory (and also used in SPA-Rew) while the rest of them are specified in a text file used by Maude.

Implementations and Experiments

Testing shows that the instant method (SPA+Rew) is competitive with an optimized DFS-SE implementation, inspite of additional overhead of computing joins and term simplification. Moreover, SPA outperforms DFS-SE without incremental SMT (but with rewriting) in most cases. Further, rewriting path conditions even improves the performance of plain DFS-SE. SPA is competitive on these benchmarks with the F-Soft implementations of other software verification techniques, e.g., based on bounded model checking and predicate abstraction.

In general, the average time for invoking a rewrite engine (with a large number of rules) is no more than that associated with using a DP. Also, rewriting often simplifies a formula to either a constant or simple enough to be checked heuristically for satisfiability. However, the current set of rules are not effective in simplifying predicate terms of large size, mainly due to the fact that the conditional rules require recursive rewriting to decide such terms. Rewriting based simplification assists the instant program analysis (and SMT solvers) dramatically in scaling up. However, eager rewriting, especially for formulas, neutralizes the improvements obtained to a certain extent.

In sum, the symbolic program analysis (SPA) method that uses symbolic terms to perform a precise data-flow analysis on programs, by merging symbolic values from different paths. SPA tries to capture program structure in the symbolic state (terms) computed during analysis and avoids analyzing the same CFG region multiple times. To this goal, SPA first imposes a work-list ordering to follow program structure and combines path information using choose-terms. Second, SPA exploits the term structure to perform on-the-fly simplification and generalization during analysis before flattening to clauses inside an SMT solver. Preliminary experiments show that the instant technique scales to real-life programs and is competitive than other software verification techniques. Term rewriting based simplification may be viewed as a systematic preprocessing front-end to SMT-solvers, to improve handling of structured terms. Besides, simplification leads to concise summaries during program analysis. SPA can also benefit traditional symbolic execution by computing function summaries for the latter.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

One skilled in the art will recognize that various flowcharts and block diagrams described herein represent functional steps and functional elements of various embodiments of the invention. Actual hardware embodiments may vary and it will be readily apparent to one skilled in the art how to implement the various embodiments of the invention given the description herein. For example, the functions described herein may be performed by computers containing processors which are executing computer program code which defines the functionality described herein.

Figure 5:
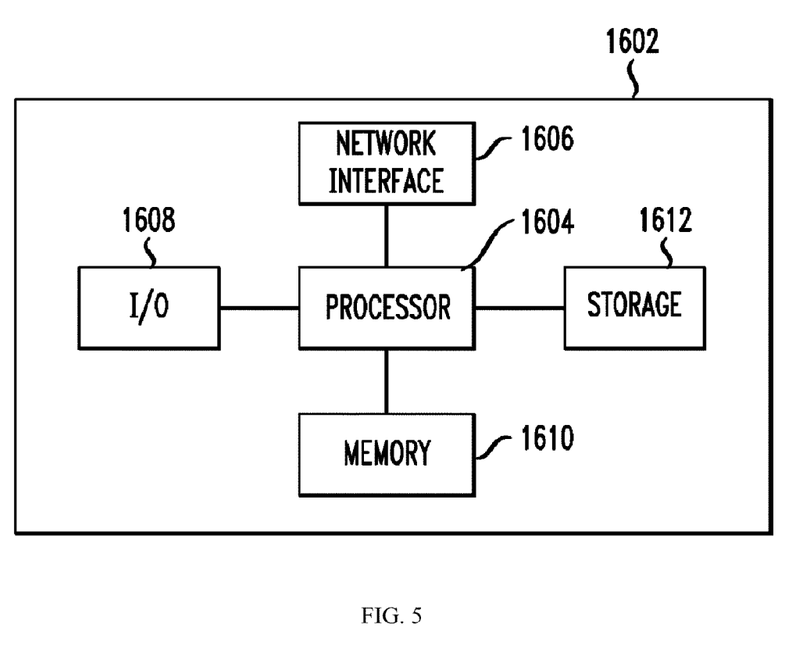
FIG. 5 shows an exemplary computer system to perform software verification.

Such computers are well known in the art, and may be implemented, for example, using well known computer processors, memory units, storage devices, computer software, and other components. A high level block diagram of such a computer is shown in FIG. 5. Computer 1602 contains a processor 1604 which controls the overall operation of computer 1602 by executing computer program instructions which define such operation. The computer program instructions may be stored in a storage device 1612 (e.g., magnetic disk) and loaded into memory 1610 when execution of the computer program instructions is desired. Thus, the operation of computer 1602 is defined by computer program instructions stored in memory 1610 and/or storage 1612 and the computer 1602 will be controlled by processor 1604 executing the computer program instructions. Computer 1602 also includes one or more network interfaces 1606 for communicating with other devices via a network. Computer 1602 also includes input/output 1608 which represents devices which allow for user interaction with the computer 1602 (e.g., display, keyboard, mouse, speakers, buttons, etc.). One skilled in the art will recognize that an implementation of an actual computer will contain other components as well, and that FIG. 3 is a high level representation of some of the components of such a computer for illustrative purposes. One skilled in the art will also recognize that the functionality described herein may be implemented using hardware, software, and various combinations of hardware and software.

The instant system running on computer 1602 enables tightly integrating static analysis methods with automated theorem proving as opposed to generating verification conditions to be discharged by a theorem prover at a later stage. Although rewriting techniques were used mainly for removing term redundancies currently, the instant framework can be extended to perform saturation-based theorem proving to simplify terms with uninterpreted symbols, arrays, bitvectors, and recursive data structures (see, e.g.,). The instant technique can be modular by using function summaries. Systematic strategies can be defined for application of rewrite rules. The instant framework provides the means for exploiting theorem proving techniques focused towards the goal of program analysis by allowing a synergistic use of different theorem proving components, e.g., decision procedures, unification and rewriting.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A computer implemented method for analyzing dataflow using program expressions or terms, comprising:
    a. extracting a control flow graph node from a work list;
    b. representing a symbolic state as a condition-map pair (C, σ) where C denotes a current path condition predicate and σ denotes a map from program variables to symbolic values;
    c. merging symbolic term values at join nodes to avoid path-explosion by using choose and if-then-else (ite) function operators, where choose is a term of form choose $((C_1,t_1),(C_2,t_2),(C_3,t_3))$ on expression sort with a non-deterministic choice between the values $t_i$ ($1 \leq i \leq 3$) given a corresponding condition $C_1$;
    d. performing simplification of term values using rewriting logic, wherein a set of rules for simplifying choose and ite terms are used along with rules for simplifying Presburger arithmetic expressions;
    e. determining successors of the graph node to which data must be propagated;
    f. updating symbolic data for elements of the successors;
    g. performing anti-unification to generalize similar terms obtained at a loop head; and
    h. displaying the program analysis for code review.

2. The method of claim 1, comprising performing symbolic program analysis through decision procedures with rewriting engines.

3. The method of claim 2, wherein the decision procedures comprise a Satisfiability Modulo Theories (SMT) solver.

4. The method of claim 1, comprising determining join if needed.

5. The method of claim 1, wherein the successors are determined using a Satisfiability Modulo Theories (SMT) solver.

6. The method of claim 1, comprising simplifying choose-terms to if-then-else (ite)-terms.

7. The method of claim 1, comprising simplifying ite-terms by using equational axioms, semantic rules and rules for presburger arithmetic.

8. The method of claim 1, comprising simplifying terms at loop nodes using anti-unification.

9. The method of claim 7, comprising constructing a bounded parameterized term.

10. The method of claim 7, comprising computing a bounded parameterized term by generalizing from individual terms obtained during symbolic analysis at loop head.

11. The method of claim 7, comprising generalizing similar terms obtained at a loop head.

12. The method of claim 1, comprising representing analysis results during symbolic program analysis using choose and ite function operators.

13. The method of claim 1, comprising using rewriting rules in a rewrite logic to uniformly simplify terms over a combination of theories.

14. The method of claim 1, comprising representing data as condition-value pairs and computing joins using choose functions over such pairs.

15. The method of claim 1, comprising simplifying symbolic terms during program analysis using a rewrite engine.

16. The method of claim 1, comprising simplifying ite expressions using equational axioms and semantic methods.

17. The method of claim 1, comprising rewrite system comprises Presburger arithmetic rules in a rewrite logic theory.

18. The method of claim 1, comprising simplifying, approximating and generalizing terms obtained from symbolic program analysis at loop heads using anti-unification.

19. The method of claim 1, comprising computing loop invariants given a parameterized term representation.

20. The method of claim 1, comprising computing an under-approximation based on a parameterized term representation.

* * * * *